United States Patent
Arvinte et al.

(10) Patent No.: US 10,116,417 B1
(45) Date of Patent: Oct. 30, 2018

(54) NONLINEAR MIMO-OFDM DETECTOR

(71) Applicant: NXP USA, Inc., Austin, TX (US)

(72) Inventors: Marius Octavian Arvinte, Bucharest (RO); Andrei Alexandru Enescu, Bucharest (RO); Leo Dehner, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/823,756

(22) Filed: Nov. 28, 2017

(30) Foreign Application Priority Data

Sep. 25, 2017 (RO) ...................... A/00719

(51) Int. Cl.
*H04L 27/06* (2006.01)
*H04L 1/00* (2006.01)
*H04L 25/03* (2006.01)
*H04L 27/26* (2006.01)

(52) U.S. Cl.
CPC ...... *H04L 1/0045* (2013.01); *H04L 25/03891* (2013.01); *H04L 27/2666* (2013.01)

(58) Field of Classification Search
CPC ............. H04L 1/0045; H04L 25/03891; H04L 27/266
See application file for complete search history.

(56) References Cited

U.S. PATENT DOCUMENTS

| 8,238,482 B2* | 8/2012 | Chen ................... H04L 25/0236 375/316 |
| 8,279,977 B2 | 10/2012 | Rayala |
| 9,118,373 B1 | 8/2015 | Patel et al. |
| 2009/0296842 A1* | 12/2009 | Papadopoulos ... H04L 25/03216 375/260 |
| 2011/0007851 A1 | 1/2011 | Li |
| 2012/0155579 A1* | 6/2012 | Zilberman ........ H04L 25/03216 375/341 |
| 2015/0155971 A1* | 6/2015 | Dvoretzki ............. H04L 1/0054 375/341 |

OTHER PUBLICATIONS

Ro, J., et al., "Modified Tree Structure QRD-M in MIMO-OFDM Systems," Journal of Intelligent Computing, vol. 8, No. 1, Mar. 2017, pp. 10-15.
Yue, J., et al., "Channel Estimation and Data Detection for MIMO-OFDM Systems," Globecom 2003, pp. 581-585.

* cited by examiner

*Primary Examiner* — Dac Ha

(57) ABSTRACT

A nonlinear MIMO-OFDM detector includes a vector arithmetic unit (VAU) that sequentially computes first metrics corresponding to a first current tree level of a first search tree and second metrics corresponding to a second current tree level of a second search tree. A sorting and indexing unit (SIU) that sorts the first metrics and the second metrics sequentially received from the VAU and that sequentially provides first indices of lowest first metrics and second indices of lowest second metrics to the vector arithmetic unit. The lowest first metrics are first inputs to the VAU for a first next tree level of the first search tree and the lowest second metrics are second inputs to the VAU for a second next tree level of the second search tree. The VAU and the SIU are pipelined to compute the second metrics concurrently with sorting and indexing of the first metrics.

20 Claims, 12 Drawing Sheets

NONLINEAR MIMO-OFDM DETECTOR

BACKGROUND

Field of the Invention

The invention relates to communications systems and more particularly to signal detection in multiple input, multiple output orthogonal frequency-division multiplexing (MIMO-OFDM) communications systems.

Description of the Related Art

In general, a MIMO-OFDM communication system uses $N_T$ transmitter antennas and $N_R$ receiver antennas ($N_R \geq N_T > 1$) to communicate data using multiple parallel data channels. A transmitter partitions an original data stream into multiple parallel data substreams. The transmitter uses OFDM transmission techniques to reduce or eliminate effects of intersymbol interference between the parallel data substreams, which are transmitted using corresponding transmitter antennas. The receiver includes a nonlinear MIMO-OFDM detector, which uses a search tree data structure and tree search operations to estimate a transmitted symbol for each of the parallel data substreams based on signals received using the $N_R$ receiver antennas. The tree search operations search the nodes of the search tree starting at a root node of the tree and visit each node of the tree to identify a node having the lowest metric. A search tree having $N_T$ tree layers detects symbols for each tree layer successively at each tree level. A breadth-first tree search starts at the root node and explores neighbor nodes first, before moving to the next level neighbors. The tree search operation is computationally intensive and its complexity increases with increases to the number of antennas, the number of OFDM subcarriers, and the order of the modulation scheme used. Thus, low cost techniques for implementing the tree search operation are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

Figure 1:
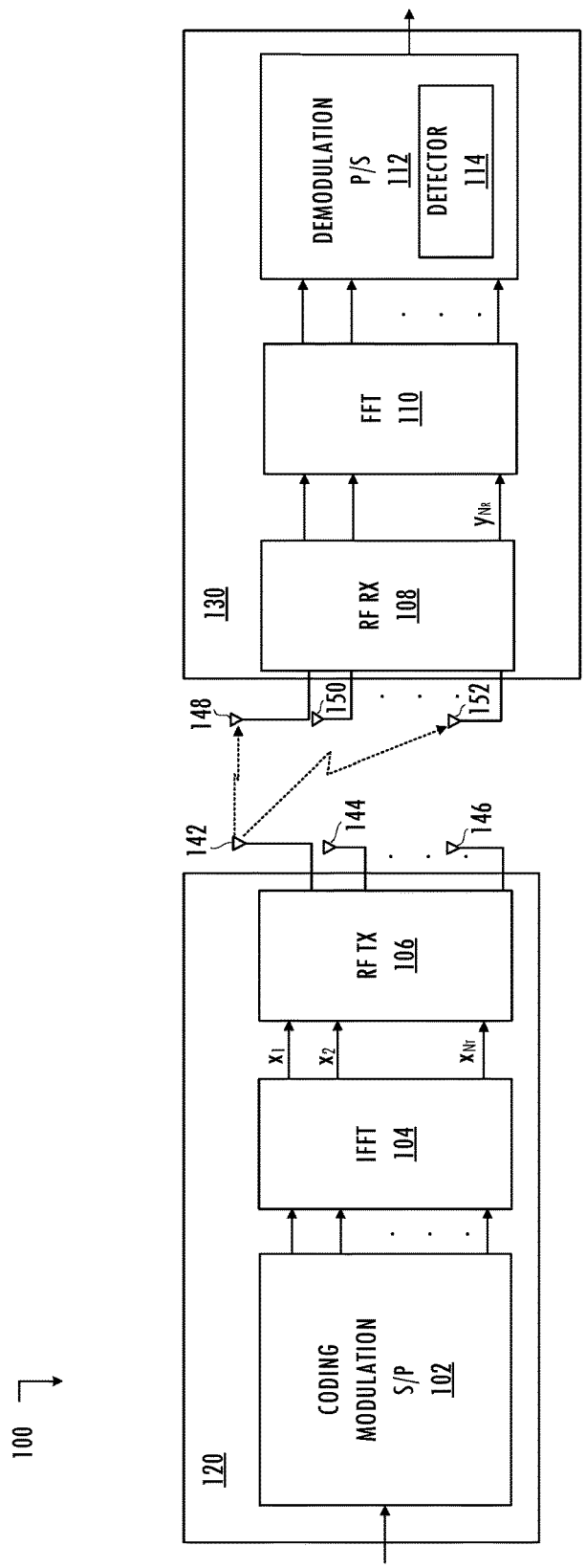
FIG. 1 illustrates a functional block diagram of an exemplary MIMO-OFDM communications system.

Referring to FIG. 1, an exemplary MIMO-OFDM communications system includes transmitter system 120 configured to receive serial data by a coding, modulation, and serial-to-parallel conversion processor 102. An inverse fast Fourier transform (IFFT) modulator 104 converts parallel data in OFDM symbols into time-domain signals which are converted by radio-frequency transmitter 106 into radio frequency signals for transmission by transmitter antennas 142, 144, and 146. Receiver antennas 148, 150, and 152 receive radio frequency signals and provide them to radio frequency receiver 108 of receiver system 130. Radio frequency receiver 108 provides a plurality of parallel baseband signals to fast Fourier transform (FFT) demodulator 110, which converts those signals to parallel frequency domain OFDM symbols. Detector 114 in demodulator, parallel-to-serial converter 112 detects the transmitted symbols from the parallel frequency domain OFDM symbols, demodulates the data and provides the demodulated data in a serial data stream.

A narrowband, flat-fading MIMO transmission of MIMO-OFDM communications system 100 is characterized by equation:

$$y = Hx + n, \text{ where:}$$

y is an $N_R \times 1$ received signal column vector;
x is an $N_T \times 1$ transmitted signal column vector;
n is an $N_R \times 1$ noise signal column vector; and
H is an $N_R \times N_T$ MIMO channel matrix,
where $N_T$ is the number of transmitter antennas and $N_R$ is the number of receiver antennas and $N_R \geq N_T > 1$. The elements of the transmitted signal x are drawn from a finite set of values, i.e. possible values of a signal constellation (e.g. QPSK, 16-QAM, etc.). In addition, note that MIMO-OFDM communications system 100 uses S subcarriers. Each subcarrier k of the S subcarriers has a corresponding received signal column vector $y_k$, transmitted signal column vector $x_k$, noise signal vector $n_k$, and channel frequency response $H_k$. However, for simplicity, the node metric computations in the discussion below are directed to computations for an individual subcarrier and its corresponding search tree and subscripts for designating a particular subcarrier are omitted.

In general, the function of a MIMO detector is to correctly estimate the transmitted symbols in the presence of MIMO interference and noise. A typical nonlinear MIMO detector provides a considerable performance gain as compared to conventional linear decoding (e.g. minimum mean squared error (MMSE), zero forcing (ZF), etc.) and is implemented using a tree search algorithm and preprocessing of the received signal based on knowledge of the channel. For example, QR decomposition factors the channel matrix H into a product of an $N_R \times N_R$ unitary matrix Q and an $N_R \times N_T$ upper triangular matrix R. The decomposition may be performed using Gram-Schmidt process, Householder transformation, Givens rotations, or other suitable technique. Thus, $$H = QR,$$

and the preprocessed received signal $\tilde{y}$ is:

$$\tilde{y} = Q^H y = Rx + n = \begin{bmatrix} r_{1,1} & r_{1,2} & \cdots & r_{1,N_T} \\ 0 & r_{2,2} & \cdots & r_{2,N_T} \\ \vdots & \vdots & \ddots & \vdots \\ 0 & 0 & \cdots & r_{N_T,N_T} \\ \vdots & \vdots & \ddots & \vdots \\ 0 & 0 & \cdots & 0 \end{bmatrix} x + n.$$

The preprocessed received signal is used to form a search tree with a starting node $r_{N_T,N_T}$, and having tree levels corresponding to rows of R. Detector 114 uses a breadth-first search tree algorithm to process the search tree to identify the path from start to finish with the lowest metric for each transmitter antenna. Detector 114 decodes symbols for each tree layer successively at each tree level (i.e., tree stage). As referred to herein, a tree level is the layer of a search tree currently being processed, i.e., the depth reached by the nonlinear detector, and a tree layer (i.e., MIMO layer) is the MIMO layer that is decoded. The number of tree levels is $N_T$ and the total number of tree layers is $N_T$. Note that in an embodiment, detector 114, detector 114 estimates only the first tree layer at the first tree level. In the second tree level, detector 114 estimates the second tree layer and refines (e.g., re-estimates) the first tree layer. In subsequent tree levels, detector 114 estimates the subsequent tree layer and refines prior tree layers (e.g., in the third tree layer, detector 114 estimates the third tree layer and refines the first tree layer and the second tree layer).

Regardless of the tree search strategy (e.g. Maximum Likelihood, K-Best Sphere Decoder, QRD-M, etc.), a breadth-first tree traversal for nonlinear MIMO-OFDM detection can be decomposed into algebraic operations (e.g., multiply and accumulate operations) and sorting operations. Detector 114 includes two functional units: a Vector Arithmetic Unit (VAU) and a Sorting and Indexing Unit (SIU). The VAU computes node metrics using elementary multiply-accumulate (MAC) operations for each tree level. In at least one embodiment, the VAU includes a processor and memory. The processor may be a vector processor, digital signal processor, or other suitable processor. The processor is configured to execute instructions stored in the memory to cause the processor to compute node metrics. The SIU may be implemented as a coprocessor or accelerator to the VAU, and may include custom logic or may include other instructions configured to execute instructions stored in memory that cause the processor (or another processor) to perform the sorting and indexing functions.

Figure 2:
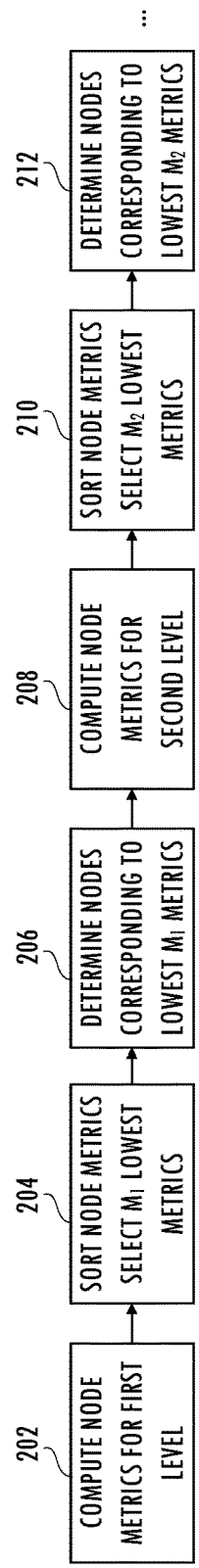
FIG. 2 illustrates an exemplary process flow for a nonlinear MIMO-OFDM detector.

The following description of detector 114 uses the following notation:
C is a Q×1 vector representing the signal constellation;
q is the number of bits per constellation symbol (q=$\log_2$Q);
M is a $N_T \times 1$ vector that gives the number of surviving candidates (retained nodes) at each tree level of the tree search; and
$idx_i^{(j)}$ represents the indices of the surviving nodes of the i-th layer at the j-th tree level.
Detector 114 expands $M_k$ surviving candidates (tree nodes) from each tree level in a next tree level for all C constellation points, and selects, in that next tree level, a new number $M_{k+1}$ of surviving candidates. Referring to FIG. 2, an exemplary detector 114 computes node metrics for a first tree level (202), sorts the node metrics and selects $M_1$ lowest node metrics from the sorted node metrics (204), and determines the nodes corresponding to the lowest $M_1$ node metrics (206). Then, detector 114 continues the tree search at a next tree level by computing node metrics for the second tree level (208), sorting the node metrics and selecting $M_2$ lowest metrics (210), and determining the nodes corresponding to the lowest $M_2$ node metrics (212). Detector 114 performs similar operations for additional tree levels and uses the final lowest node metric to detect, for each $N_T$ transmitter antenna, a corresponding transmitted symbol. That is, the node of the search tree with the lowest metric at the final tree level is the winning node of the tree search. That node is associated with an entire path that identifies the constellation points of the symbols by the $N_T$ transmitter antennas. The indices of those constellation points (i.e., $N_T$ indices for $N_T$ corresponding constellation points) in the C vector are given by the first values in each of the $idx_i^{(N_T)}$ index vectors, where i is an integer, $1 \leq i \leq N_T$.

The sequence of tree search functions performed by detector 114, as described in FIG. 2, is inefficient because the sorting function has substantially greater complexity than the node metric computation function. Practical algorithms have a best-case for the sorting function having O(n log n) time complexity as compared to O(n) time complexity for the node metric computations and a worst-case for the sorting function having O(n²) time complexity as compared to O(n) time complexity for the node metric computations. In addition, the serial processing of levels by detector 114 of FIG. 2 is inefficient because the serial processing requires that the processing for a next level of the tree search depends on completion of the sorting and index management operations for the current level.

In general, the sorting function dominates the complexity and cost of detector 114 and can cause processing stalls. Embodiments of detector 114 described below, pipeline the VAU and SIU and some embodiments further increase throughput of detector 114 by using multiple, smaller sorting engines executing in parallel. Those smaller sorting engines perform specific tree search index management functions in an efficient way: instead of waiting for the entire VAU processing to be completed for a given tree level, the SIU operates as soon as possible on batches including fewer nodes.

Figure 3:
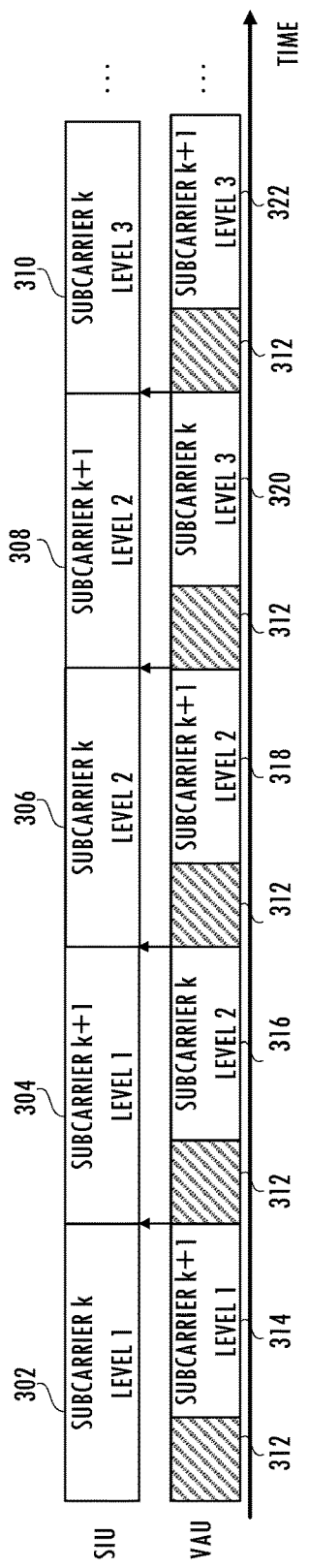
FIG. 3 illustrates an exemplary process flow for a pipelined nonlinear MIMO-OFDM detector consistent with at least one embodiment of the invention.

Referring to FIG. 3, an embodiment of detector 114 uses two processing engines, each tasked with a portion of the functional processing and arranged to improve throughput of the breadth-first tree search as compared to the serial implementation of FIG. 2. Detector 114 of FIG. 3 includes a VAU and an SIU. The VAU computes the node metrics for each tree level and the SIU includes two sub-blocks. A sorting unit sorts the metrics output by the VAU at a current tree level and the indexing sub-block that indexes the node metrics needed by the VAU at a next tree level. In addition, the embodiment of detector 114 exploits the orthogonality of OFDM subcarriers. That is, while the VAU computes the node metrics at a particular tree level for a subcarrier, the SIU sorts the results of the same tree level for the previous subcarrier.

For an exemplary system, the SIU sorts and indexes the VAU output for a first tree level of the search tree for subcarrier k (302) concurrently with the VAU computing node metrics for the first tree level of the search tree for another subcarrier (e.g., subcarrier k+1) (314). Although illustrated for the search trees for adjacent subcarriers of an OFDM symbol, note that the concurrent processing may be performed for search trees for nonadjacent subcarriers of the OFDM symbol or for search trees for subcarriers of different OFDM symbols. The VAU provides the node metrics for the first tree level of the search tree for subcarrier k+1 to the SIU. In response, the SIU sorts and indexes those node metrics (304), while the VAU computes node metrics for the second tree level of the search tree for subcarrier k (316). The VAU provides the node metrics for the second tree level of the search tree for subcarrier k to the SIU. In response, the SIU sorts and indexes node metrics for the second tree level of the search tree for subcarrier k (306), while the VAU computes node metrics for the second tree level of the search tree for subcarrier k+1 (318).

The VAU provides the node metrics for the second tree level of the search tree for subcarrier k+1 to the SIU. In response, the SIU sorts and indexes node metrics for the second tree level of the search tree for subcarrier k+1 (308), while the VAU computes node metrics for the third tree level of the search tree for subcarrier k (320). The VAU provides the metrics for the third tree level of the search tree for subcarrier k to the SIU. In response, the SIU sorts and indexes node metrics for the third tree level of the search tree for subcarrier k (310), while the VAU computes node metrics for the third tree level of the search tree for subcarrier k+1 (322). The VAU and SIU may continue the pipelined processing, which is interleaved by subcarrier search tree for each tree level for additional tree levels. Since the SIU processing takes longer than the VAU processing, the processing at each tree level includes VAU idle time (312). In addition, if M or Q has a large value, many node metrics must be sorted at once by the SIU, requiring a substantial amount of internal memory for use by the SIU. For example, if Q=64 and $M_1$=8, then the SIU must sort $M_1Q$=512 values in the second level of the detector.

Figure 4:
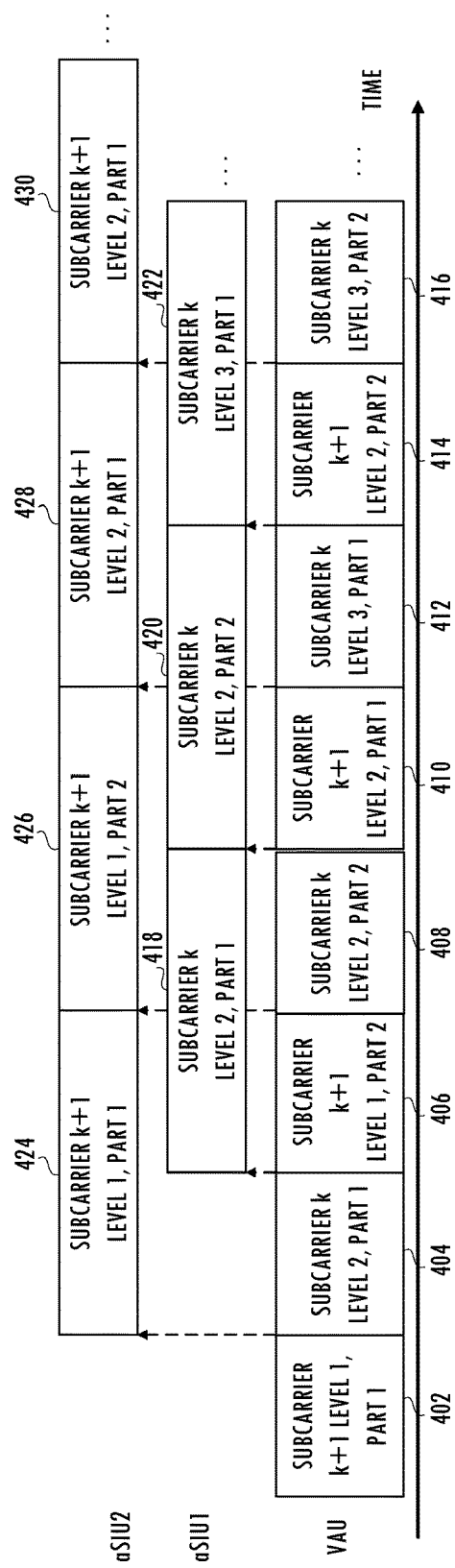
FIG. 4 illustrates an exemplary process flow for a pipelined nonlinear MIMO-OFDM detector including multiple atomic sorting and indexing units consistent with at least one embodiment of the invention.

Referring to FIG. 4, in at least one embodiment, detector 114 has reduced VAU idle time and reduced SIU memory requirements due to splitting the SIU into multiple, parallel atomic SIUs (aSIUs, e.g., aSIU1 and aSIU2) and pipelining execution of those atomic SIUs with VAU execution. Each atomic SIU includes a smaller, fixed size sorting unit that operates incrementally on each batch (e.g., part 1 or part 2) of VAU output metrics. Note that the number of aSIUs is flexible and can be adjusted according to the processing power of the VAU. A system with a VAU having processing speed on par with the SIU benefits from an increased number of aSIU units that will help reduce the VAU idle time that would occur with a single sorting unit. However, a system with a VAU that is considerably slower than the SIU can still benefit from a moderate number of aSIUs, if the sorting operation has higher complexity than the algebraic expressions implemented by the VAU.

For an exemplary system where $N_T$ equals four, the search tree includes four tree levels and aSIU1 sorts and indexes the VAU outputs for subcarrier k and aSIU2 sorts and indexes the VAU outputs for subcarrier k+1, VAU alternates round-robin between computations for each subcarrier. For example, the VAU computes part 1 of node metrics for a first tree level for subcarrier k+1 (402) and provides the node metrics for part 1 to aSIU2, which sorts and indexes part 1 of the node metrics for the first tree level (424). Meanwhile, the VAU computes part 1 of node metrics for a second tree level for subcarrier k (404) and provides the node metrics for part 1 to aSIU1, which sorts and indexes part 1 of the node metrics for the second tree level for subcarrier k (418). Concurrently with those operations of aSIU1, the VAU computes part 2 of node metrics for the first tree level for subcarrier k+1 (406) and provides the node metrics for part 2 to aSIU2, which sorts and indexes part 2 of the node metrics for the first tree level (426). The next VAU computation generates part 2 of the node metrics for the second tree level for subcarrier k (408) and provides the node metrics for part 2 to aSIU1, which sorts and indexes part 2 of the node metrics for the second tree level for subcarrier k (420). The next VAU computation generates part 1 of node metrics for the second tree level for subcarrier k+1 (410) and provides those node metrics to aSIU2, which sorts and indexes part 1 of the node metrics for the second tree level for subcarrier k+1 (428). The VAU continues by generating part 1 of node metrics for the third tree level for subcarrier k (412) and provides those node metrics to aSIU1, which sorts and indexes part 1 of the node metrics for the third tree level for subcarrier k (422). The next VAU computation generates part 2 of node metrics for the second tree level for subcarrier k+1 (414) and provides the node metrics for part 2 to aSIU2, which sorts and indexes part 2 of the node metrics for the second tree level for subcarrier k+1 (430). The VAU continues to compute node metrics (e.g. with part 2 of the node metrics for the third tree level of subcarrier k (416)) in a round-robin order and provides those node metrics to a corresponding aSIU, until each search tree has been traversed. Note that in other embodiments of detector 114, the number of aSIUs, the number of tree levels, and the number of parts per tree level may vary. Thus, the round-robin order may vary accordingly.

Figure 5:
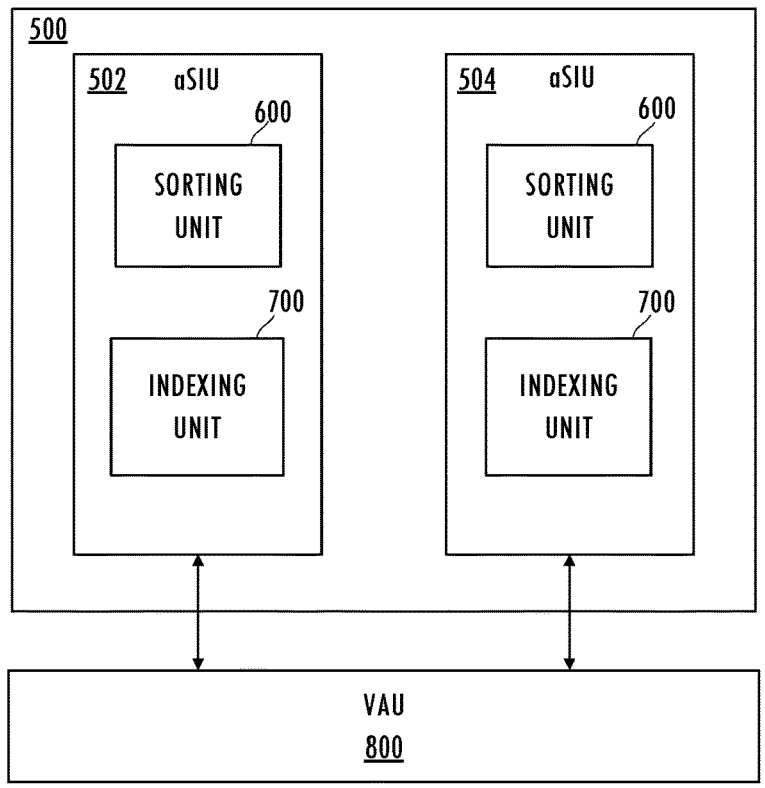
FIG. 5 illustrates a functional block diagram of an exemplary pipelined architecture of a nonlinear MIMO-OFDM detector including multiple atomic sorting and indexing units consistent with at least one embodiment of the invention.
Figure 6:
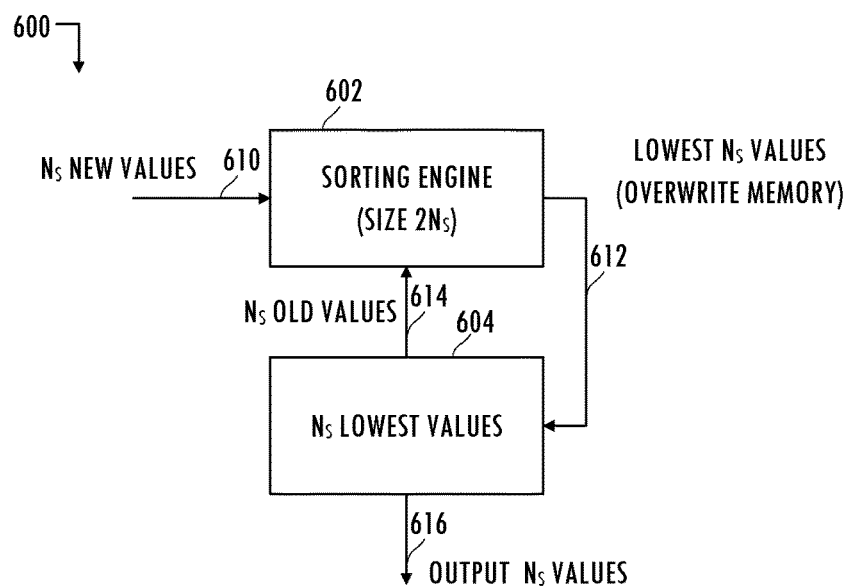
FIG. 6 illustrates a functional block diagram of an exemplary sorting unit of an atomic sorting and indexing unit of a nonlinear MIMO-OFDM detector consistent with at least one embodiment of the invention communications system.

Referring to FIG. 5, in at least one embodiment, SIU 500 includes aSIU 502 and aSIU 504. Each of the aSIUs includes sorting unit 600 and indexing unit 700. VAU 800 is pipelined with aSIU 502 and aSIU 504 to operate consistent with the sequences of FIG. 4. Referring to FIGS. 5 and 6, an exemplary sorting engine 600 of each aSIU has a size determined based on available resources and the number of new metrics $N_S$ received from the VAU in each batch or part. Sorting engine 602 sorts the values in batches, e.g., 2×$N_S$ values (i.e., $N_S$ new values and $N_S$ prior values, which are the $N_S$ lowest metrics selected from a prior sort for the tree level and stored in storage element 604). For example, a tree level requires computation of 1024 node metrics, out of which SIU 500 retains the lowest 32 node metrics ($N_S$=32 values) in sorted order. Sorting unit 600 has a size of 64 (2×$N_S$ values=64). Accordingly, VAU 800 provides 32 values in a batch to SIU 500 (610). If the batch is the first batch, a corresponding sorting unit 600 bypasses sorting engine 602 and stores the first batch of values in storage element 604. Otherwise, sorting engine 602 receives 32 previously retained values from storage element 604 (614) and then sorts a 64-value vector formed from the batch of 32 new values and 32 previously-retained values (612). Sorting engine 602 retains the lowest 32 values and stores them in sorting engine 602. Sorting unit 600 repeats the process until all 1024 values have been sorted and the output result is the sorted, lowest 32 values (616).

Figure 7:
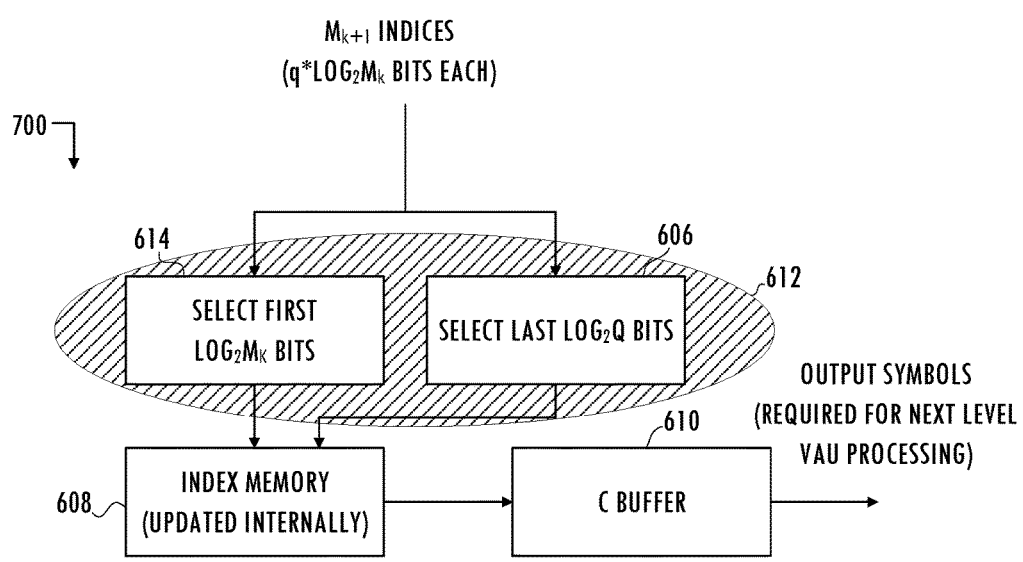
FIG. 7 illustrates a functional block diagram of an exemplary indexing unit of an atomic sorting and indexing unit of a nonlinear MIMO-OFDM detector consistent with at least one embodiment of the invention.

As described above, in addition to sorting metrics, the aSIU also performs indexing functions required for the tree search. That indexing function is performed by indexing unit 700, which provides outputs that feed the VAU for processing the next tree level. Referring to FIGS. 5 and 7, an exemplary indexing unit 700 of each aSIU receives $M_k$ indices corresponding to the lowest $M_k$ node metrics at the k-th tree level from a corresponding sorting unit 600 of the aSIU. Select operations 612 include selecting the first $\log_2 M_k$ bits (614) and selecting the last $\log_2 q$ bits (606). Select operations may be implemented using binary masking or other suitable selecting techniques. Index memory operation 608 uses the indices of first $\log_2 M_k$ bits to index previously stored values (i.e., values stored by a prior tree level) for each prior tree layer (i.e., for each tree layer except for the tree layer corresponding to the current tree level).

Referring to FIG. 5, in at least one embodiment, VAU 800 computes the node metrics according to the following two expressions:

$$y_{k,n} = y_k - \sum_{i=k+1}^{N_T} r_{k,i} C[idx_{N_T-i}^{(N_T-k)}[n]]$$

$$e_{k,n,j} = e_{k-1}[idx_{k-1}^{(k-1)}[n]] + \text{abs}(y_{k,n} - r_{k,k}C[j])^2,$$

where n ranges from 1 to $M_k$ and represents the surviving candidate index, j ranges from 1 to Q and represents the constellation point index in the buffer C, $y_{k,n}$ is the antenna data for the k-th layer and n-th previous layer (i.e., (k−1)-th layer) candidate, and $e_{k,n,j}$ is the node metric for the k-th layer, j-th constellation point, and n-th previous layer candidate. Note that if k=1, the summation term of $y_{k,n}$ is null and the first term of $e_{k,n,j}$ is null. Assuming properly indexed elements of C and $e_{k-1}$, the rest of the processing at the k-th tree level includes multiplications and additions, which can be efficiently implemented by the VAU (e.g., any modern vector processing unit).

Figure 8:
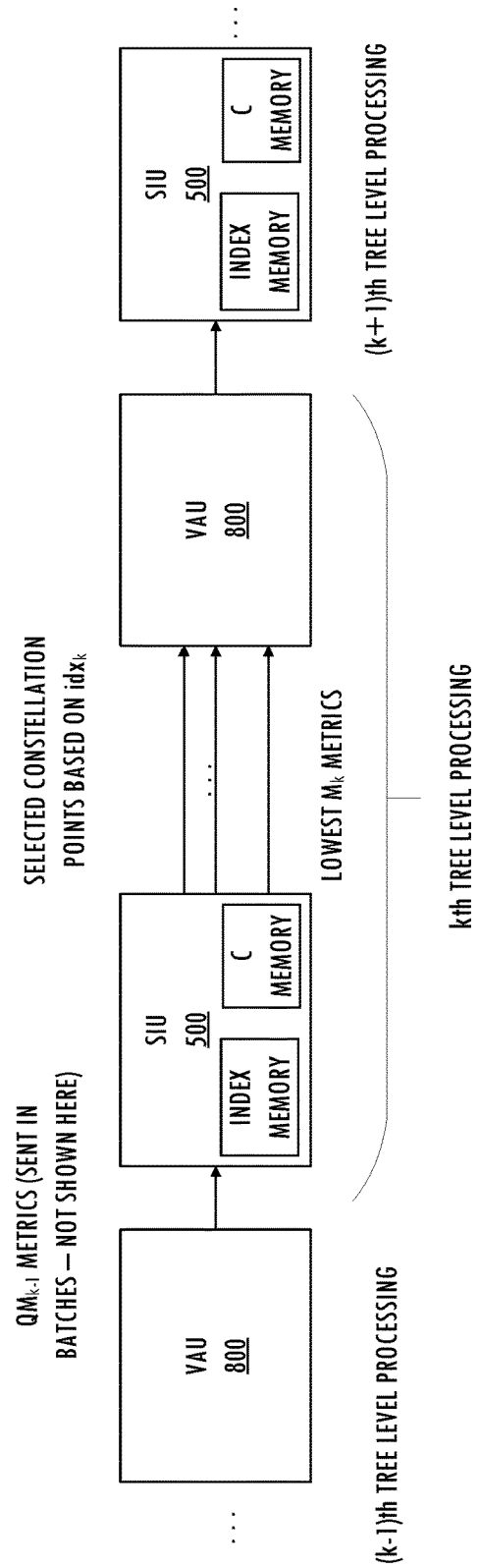
FIG. 8 illustrates an exemplary process flow for tree levels of a nonlinear MIMO-OFDM detector consistent with at least one embodiment of the invention.

FIG. 8 illustrates exemplary interactions in terms of input/output values for each tree level between VAU 800 and SIU 500, which may or may not include multiple aSIUs. For each tree level, SIU 500 receives $Q \times M_{k-1}$ metrics computed by VAU 800 for a previous tree level and which may be sent in batches or parts (not shown), as described above. SIU 500 provides node metrics corresponding to selected constellation points based on index values $idx_k$ and the lowest $M_k$ metrics to VAU 800.

Figure 9:
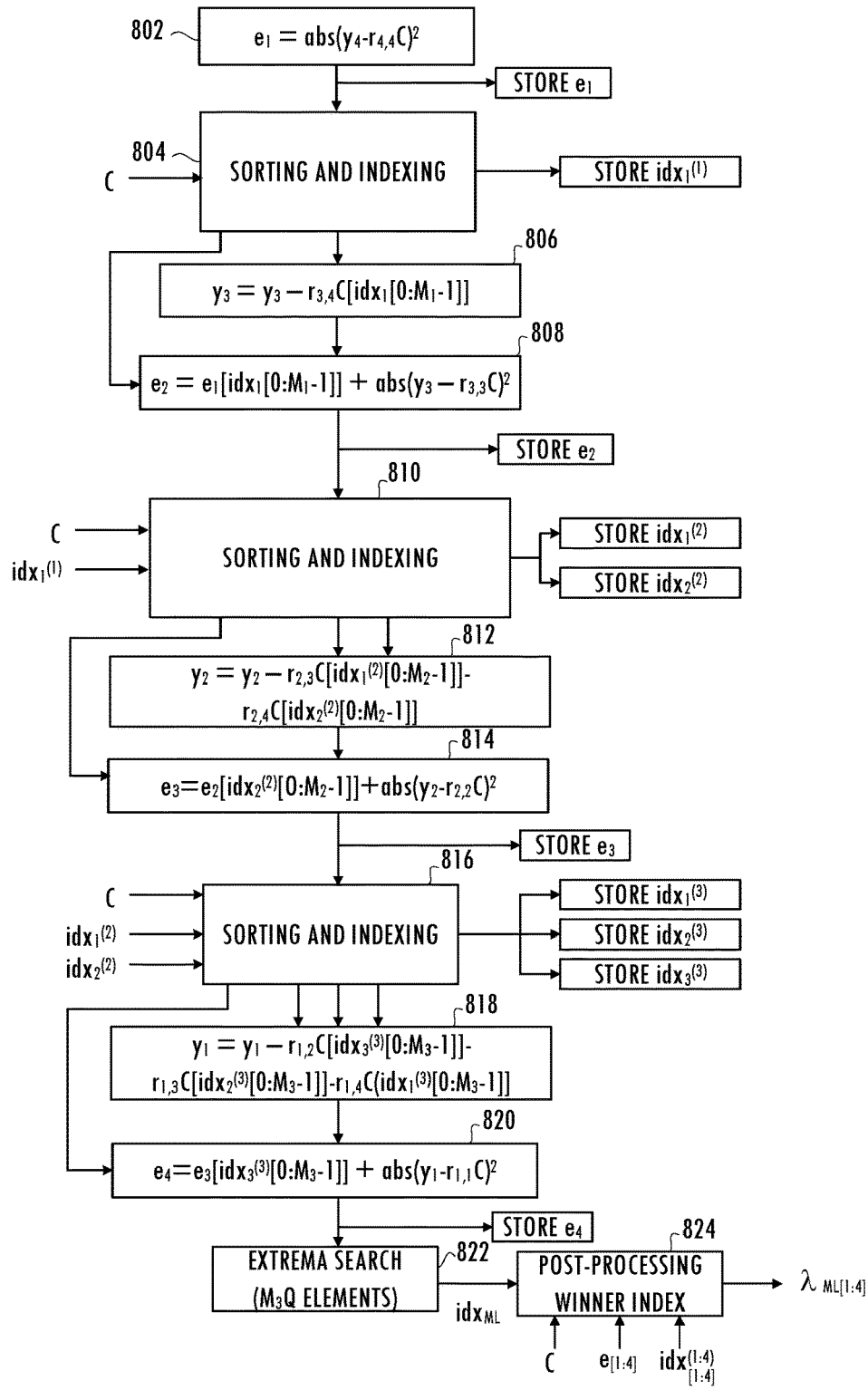
FIG. 9 illustrates a detailed process flow for a single subcarrier of a nonlinear MIMO-OFDM detector consistent with at least one embodiment of the invention.
Figure 10A:
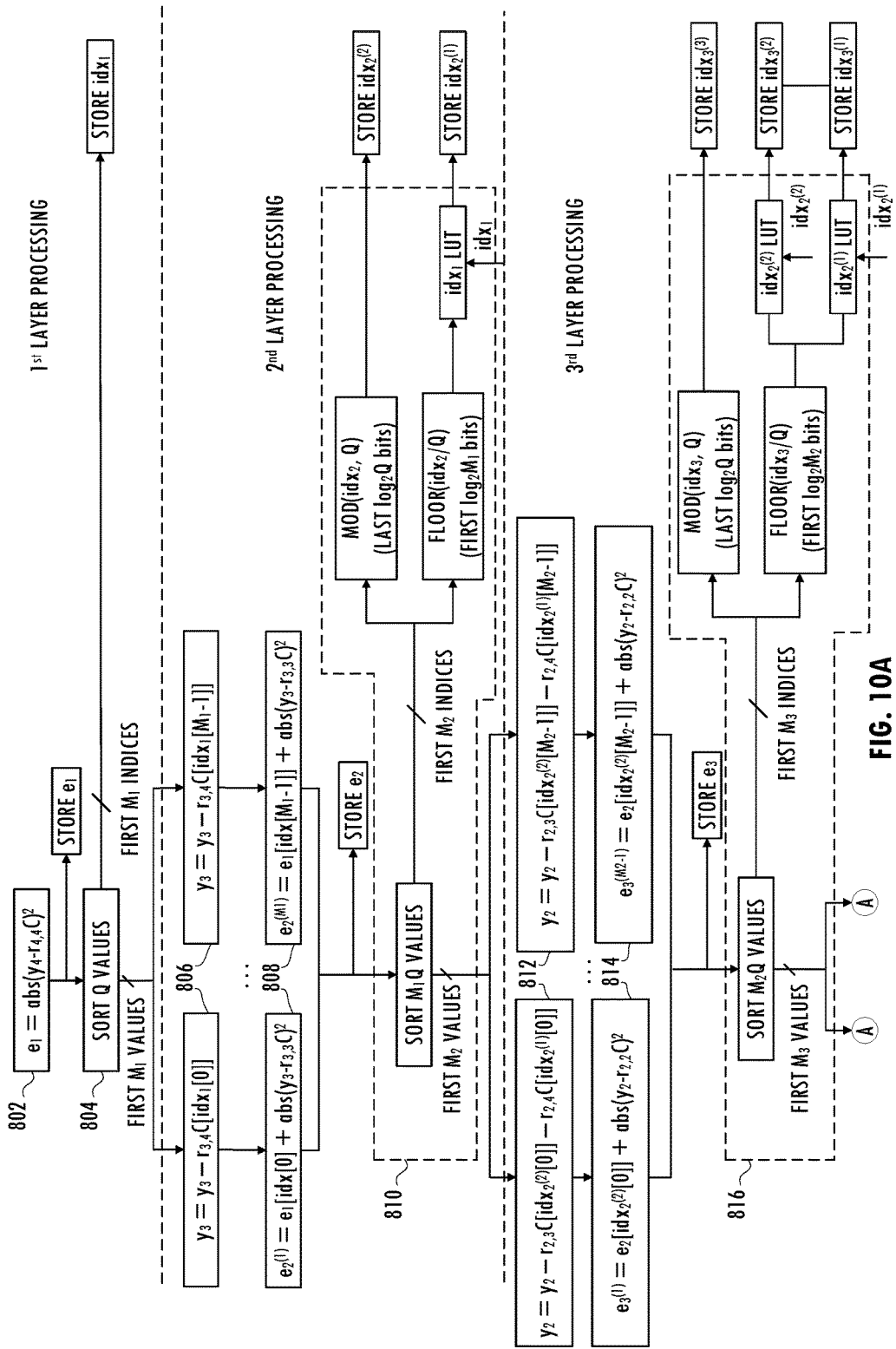
FIGS. 10A and 10B illustrate the process flow of FIG. 9 in further detail for a single subcarrier of a nonlinear MIMO-OFDM detector consistent with at least one embodiment of the invention.
Figure 10B:
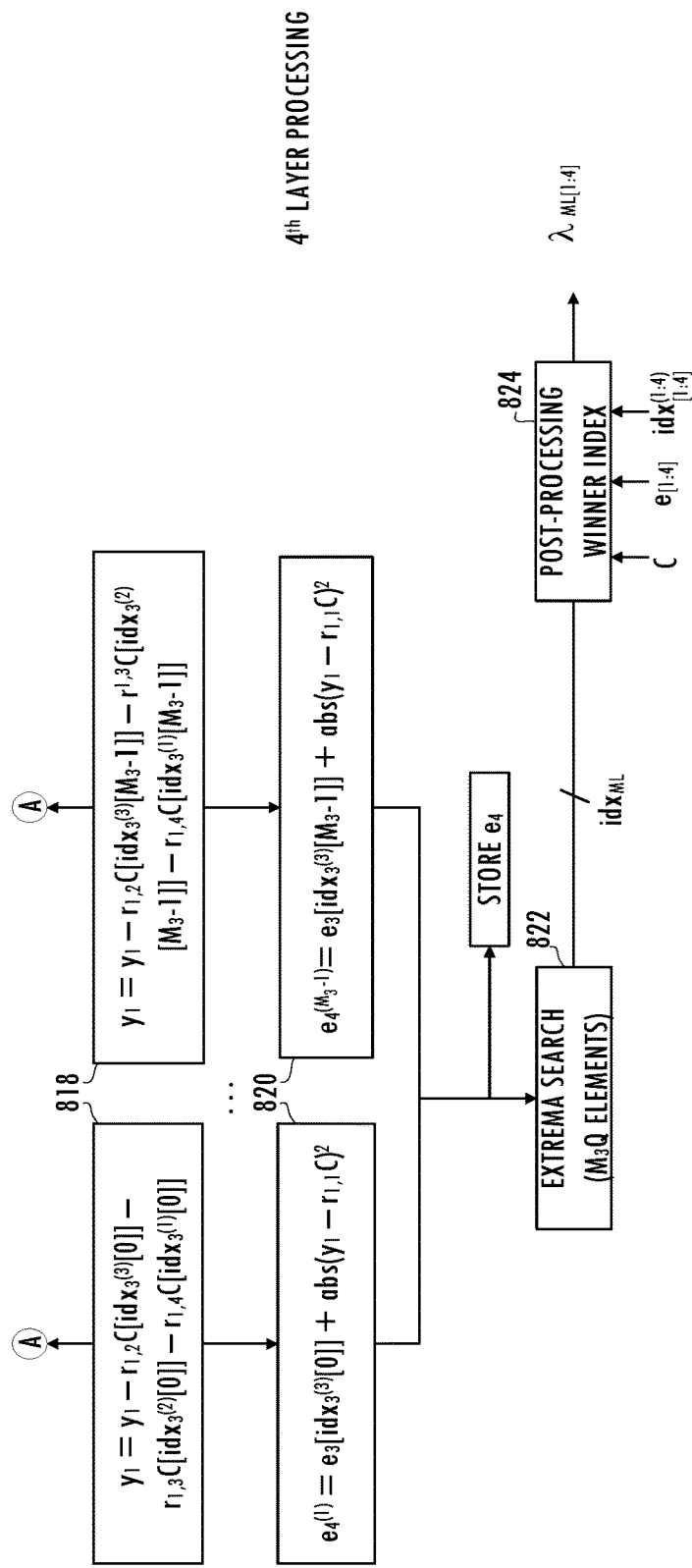

FIG. 9 and FIGS. 10A and 10B illustrate detailed descriptions of the information and processing flow implemented by VAU 800 and SIU 500 for one subcarrier in an exemplary embodiment of detector 114 in a MIMO-OFDM receiver for a system where $N_T=4$ and $N_R=4$, and Maximum Likelihood Detection and QR decomposition is used. FIGS. 10A and 10B provide additional details of the sorting and indexing operations and display expanded VAU operations. The information and processing flow includes various operations that compute
$e=|(y-rC)^2|$, where signal constellation C is a vector complex values and has length Q, r is a real valued scalar, and y is a complex-valued scalar;

$y_{OUT}=y_{IN}-\Sigma rC[idx[\alpha_k]]$, which can be broken down into multiple subtraction operations and indexing of C and idx; and $e_k^{(j)}=e_{k-1}[idx[j-1]]+\text{abs}(y_{k-1}-r_{k-1,k-1}C)^{2\cdot}$, where $e_{k-1}[idx[j-1]]$ is a real-valued scalar, which can be broken down into indexing of $e_{k-1}$ and idx and Q abs² operations that can be performed in parallel.

Detector 114 begins the tree search by computing the node metrics for the first tree level, node metrics $e_1$ (e.g., error computed using the maximum likelihood cost function)

$e_1=|(y_4-r_{4,4}C)^2|$ (802).

VAU 800 computes node metrics $e_1$ based on the finite set of values in the signal constellation C. VAU 800 generates the product of each element of the signal constellation C by element $r_{4,4}$ of the 4×4 upper triangular matrix R that corresponds to the first tree level and the starting node of the tree search. Element $r_{4,4}$ is a real valued scalar and $y_4$ is a complex valued scalar. The product includes Q elements. VAU 800 subtracts each element of a product vector from received symbol $y_4$, which is received using the fourth receiver antenna. Node metrics $e_1$ includes Q elements and the computation includes Q operations that may be performed in parallel. VAU 800 stores metrics $e_1$ in a storage element for retrieval by SIU 500. SIU 500 then sorts and indexes the elements of $e_1$ and stores the index values $idx_1^{(1)}$ of the lowest $M_1$ metrics in a storage element for retrieval by VAU 800 (804).

At the next search tree level, VAU 800 then computes $M_1$ metrics $y_3$ based on the received symbol $y_3$ and computes $M_1 \times Q$ metrics $e_2$ using a double-indexed version of metrics $e_1$ and the finite set of values in the signal constellation C, received symbol $y_3$, which is received using the third receiver antenna, and element $r_{3,4}$ of matrix R that corresponds to the second level of the search tree:
$y_3=y_3-r_{3,4}C[idx_1^{(1)}[0:M_1-1]]$, which includes $M_1$ operations (806). VAU 800 computes node metrics $e_2$:
$e_2=e_1[idx_1^{(1)}[0:M_1-1]]+\text{abs}(y_3-r_{3,3}C)^2$, which includes $M_1 \times Q$ operations and includes the node metrics retained from the prior tree level (808). VAU 800 stores node metrics $e_2$ in a storage element for retrieval by SIU 500. SIU 500 then sorts and indexes the elements of node metrics $e_2$ and stores the index values $idx_1^{(2)}$ and $idx_2^{(2)}$ for the lowest $M_2$ metrics, in a storage element (810). Exemplary indexing includes performing a modulo operation (MOD) on input index values $idx_2$ having $\log_2(QM)$ bits. The result is formed by the last $\log_2 Q$ bits and SIU 500 stores the output as $idx_2^{(2)}$. The exemplary indexing also includes performing a floor operation (FLOOR) of $idx_2$, which is formed by the first $\log_2 M_1$ bits of the input index values. SIU 500 uses the output of the floor operation to index a look-up table (LUT) for $idx_1$ and stores the output as $idx_2^{(1)}$.

At the third level of the search tree, VAU 800 then computes $M_2$ metrics $y_2$ based on the received symbol $y_2$ and computes node metrics $e_3$ via $M_2 \times Q$ operations using a double-indexed version of node metrics $e_2$ and the finite set of values in the signal constellation C, received symbol $y_2$, and elements of matrix R that correspond to the third tree level:

$y_2=y_2-r_{2,3}C[idx_1^{(2)}[0:M_2-1]]-r_{2,4}C[idx_2^{(2)}[0:M_2-1]]$, which includes $M_2$ operations (812), and
$e_3=e_2[idx_2^{(2)}[0:M_2-1]]\text{abs}(y_2-r_{2,2}C)^2$, which includes $M_2 \times Q$ operations (814). VAU 800 stores node metrics $e_3$ in a storage element for retrieval by SIU 500. SIU 500 then sorts and indexes the elements of node metrics $e_3$ and stores the index values $idx_1^{(3)}$, $idx_2^{(3)}$, and $idx_3^{(3)}$ for the lowest $M_3$ metrics in a storage element (816). Exemplary indexing for the third tree layer includes performing a modulo operation on input index values $idx_3$ having $\log_2(QM)$ bits. The result is formed by the last $\log_2 Q$ bits and SIU 500 stores the output as $idx_3^{(3)}$. The exemplary indexing for the third tree layer also includes performing a floor operation on index values $idx_3$, which is formed by the first $\log_2 M_1$ bits of the input index values. SIU 500 uses the output of the floor operation to index look-up tables (LUTs) for $idx_2^{(1)}$ and, $idx_2^{(2)}$ and stores the outputs as $idx_3^{(1)}$ and $idx_3^{(2)}$, respectively.

Figure 11:
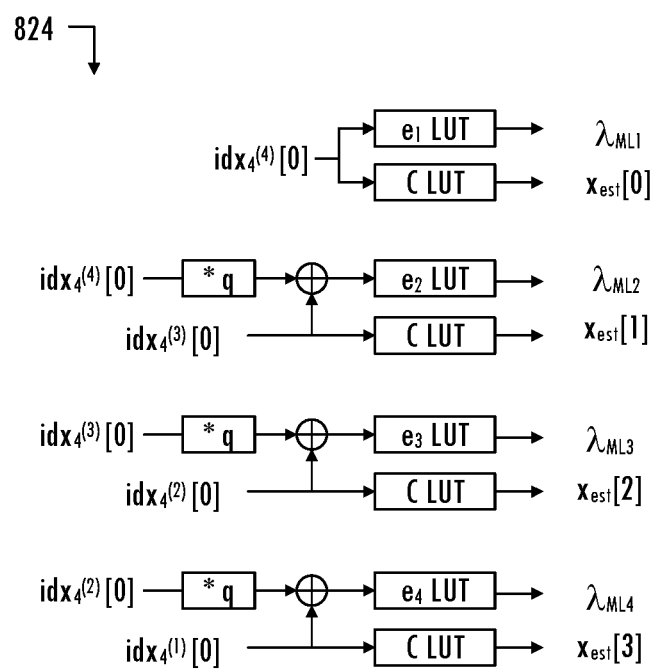
FIG. 11 illustrates exemplary self-contained post-processing of a sorting and indexing unit of a nonlinear MIMO-OFDM detector consistent with at least one embodiment of the invention.

At the fourth and final search tree level, VAU 800 then computes metrics $y_1$ using $M_3$ operations based on the received symbol $y_1$ and computes using $M_3 \times Q$ operations, node metrics $e_4$ using a triple-indexed version of metrics $e_3$ and the finite set of values in the signal constellation C, received symbol $y_1$, which is received using the first receiver antenna, and elements of matrix R that correspond to the fourth tree level:

$$y_1 = y_1 - r_{1,2} C[idx_3^{(3)}[0:M_3-1]] - r_{1,3} C[idx_2^{(3)}[0:M_3-1]] - r_{1,4} C[idx_1^{(3)}[0:M_3-1]],$$

which includes $M_3$ operations (818), and $e_4 = e_3[idx_3^{(3)}[0:M_3-1]] + abs(y_1 - r_{1,1} C)^2$, which includes $M_3 \times Q$ operations (820). VAU 800 stores metrics $e_4$ in a storage element. VAU 800 then searches through $M_3 \times Q$ elements of metrics ea to identify the single lowest node metric (e.g., indices $idx_{ML}$ corresponding to maximum likelihood symbols (822). Since this is the last tree level, only the single lowest node metric need be identified and SIU 500 performs an extrema search, i.e., minimum value search, instead of a sorting operation. SIU 500 provides the index of the lowest metric to a scalar processing unit that identifies maximum likelihood transmitted symbols $\lambda_{ML,[1:4]}$ based on the constellation C, $e_{[1:4]}$ and indices $idx_{[1:4]}^{(1:4)}$ (824). SIU 500 performs a simplified version of index processing similar to that illustrated in FIGS. 6 and 7 and the processing for the first and second tree layers, but only for a single node. SIU 500 performs self-contained post-processing of the index values $idx_{ML}$ and provides the maximum-likelihood node metrics and corresponding estimated transmitted constellation values $x_{est}$ based thereon, as illustrated in FIG. 11. For example, the post-processing uses index $idx_4^{(4)}[0]$ to index a look-up table for node metrics $e_1$ for the first tree layer, to identify maximum likelihood value $\lambda_{ML1}$, and to index a constellation look-up table to identify the corresponding estimated transmitted constellation value $x_{est}[0]$. The post-processing uses a function of indices $idx_4^{(4)}[0]$ and $idx_4^{(3)}[0]$ to index the look-up table for node metrics $e_2$ for the second tree layer, to identify maximum likelihood value $\lambda_{ML2}$, and uses index $idx_4^{(3)}[0]$ to index the constellation look-up table to identify the corresponding estimated transmitted constellation value $x_{est}[1]$. The post-processing uses a function of indices $idx_4^{(3)}[0]$ and $idx_4^{(2)}[0]$ to index the look-up table for node metrics $e_3$ for the third tree layer, to identify maximum likelihood value $\lambda_{ML3}$, and uses index $idx_4^{(2)}[0]$ to index the constellation look-up table to identify the corresponding estimated transmitted constellation value $x_{est}[2]$. The post-processing uses a function of indices $idx_4^{(2)}[0]$ and $idx_4^{(1)}[0]$ to index the look-up table for node metrics $e_4$ for the fourth tree layer, to identify maximum likelihood value $\lambda_{ML4}$, and uses index $idx_4^{(1)}[0]$ to index the constellation look-up table to identify the corresponding estimated transmitted constellation value $x_{est}[3]$. Note that only idx[0] is used to refer to the first and only element of the $idx^{(4)}$ vector, which now degenerates into a scalar, for all layers. The hard-output solution is the $N_T$ elements of the $x_{est}$ vector, which provides the indices of the detected constellation points for each MIMO layer. In addition, note that the $\lambda_{ML,i}$ values are scalars that represent the node metrics of the winning path and, in general, are less significant than the detected constellation points given by $x_{est}$.

Figure 12:
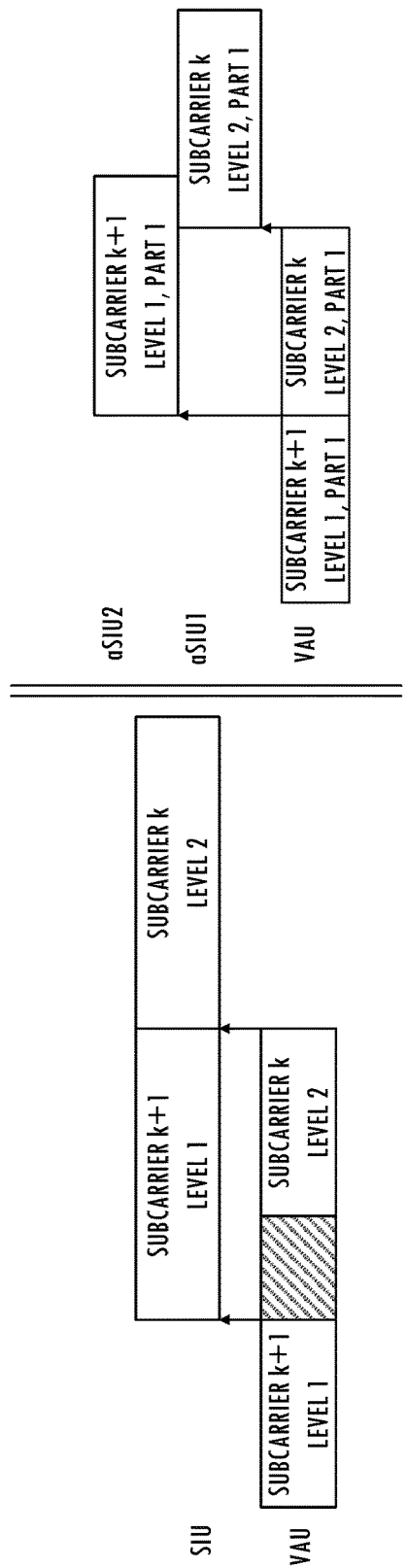
FIG. 12 illustrates variations between embodiments of a nonlinear MIMO-OFDM detector consistent with at least one embodiment of the invention.

Note that FIGS. 9-11 illustrate the decoding for only one subcarrier. However, VAU 800 may alternate computations for tree levels of search trees of different subcarriers in a round robin order, as illustrated in FIG. 4 and throughput of detector 114 may be further increased by implementing SIU 500 using multiple atomic SIUs, each aSIU being dedicated to a different subcarrier. Computation of metrics for a particular subcarrier (and aSIU) and a particular tree level by VAU 800 may be partitioned into parts (or batches) alternated with computation of batches of metrics for another subcarrier and corresponding tree level. These techniques for increasing the throughput of the tree search of detector 114 as compared to conventional detectors that perform tree searching using serial execution of computation of node metrics and sorting and indexing of those metrics are summarized in FIG. 12. The techniques described herein reduce the size of the SIU in detector 114 and the computational cost of tree searching.

In at least one embodiment, a nonlinear MIMO-OFDM detector includes a vector arithmetic unit configured to sequentially compute first metrics corresponding to a first current tree level of a first search tree and second metrics corresponding to a second current tree level of a second search tree. The nonlinear MIMO-OFDM detector includes a sorting and indexing unit configured to sort the first metrics and the second metrics sequentially received from the vector arithmetic unit and configured to sequentially provide first indices of lowest first metrics and second indices of lowest second metrics to the vector arithmetic unit. The lowest first metrics are first inputs to the vector arithmetic unit for a first next tree level of the first search tree and the lowest second metrics are second inputs to the vector arithmetic unit for a second next tree level of the second search tree. The vector arithmetic unit and the sorting and indexing unit are coupled in a pipeline that computes the second metrics concurrently with sorting and indexing of the first metrics. The first search tree corresponds to a first subcarrier of an OFDM symbol. The second search tree may correspond to a second subcarrier of the OFDM symbol.

The sorting and indexing unit may include a first atomic sorting and indexing unit configured to sort the first metrics to generate sorted first metrics and configured to identify the lowest first metrics of the sorted first metrics. The sorting and indexing unit may include a second atomic sorting and indexing unit configured to sort the second metrics to generate sorted second metrics and configured to identify the lowest second metrics of the sorted second metrics. The first and second search trees may each include p tree levels, where p is an integer greater than one, and the vector arithmetic unit may provide metrics to the first atomic sorting and indexing unit and the second atomic sorting and indexing unit for each of p tree levels in round robin order. The vector arithmetic unit may receive indices from the first atomic sorting and indexing unit and the second atomic sorting and indexing unit for each of the p tree levels in round robin order. Each of the first atomic sorting and indexing unit and the second atomic sorting and indexing unit may operate on the first metrics and the second metrics, respectively, in batches of the first metrics and the second metrics, respectively.

The nonlinear MIMO-OFDM detector may include a first storage element configured to store a first upper triangular matrix generated using QR decomposition of a first estimated channel matrix corresponding to a first subcarrier, and a second storage element configured to store a second upper triangular matrix generated using QR decomposition of a second estimated channel matrix corresponding to a second subcarrier. The first estimated channel matrix and the second estimated channel matrix may have $N_T \times N_R$ elements, where $N_T$ is a number of transmitter antennas used in a MIMO-OFDM communications system including the nonlinear MIMO-OFDM detector and $N_R$ is a number of receiver antennas used in the MIMO-OFDM communications system. The nonlinear MIMO-OFDM detector may sort and index a batch of the first metrics concurrently with sorting and indexing a batch of the second metrics and concurrently with computations of third metrics for the first next tree level.

The vector arithmetic unit may compute the first metrics and the second metrics in response to a first upper triangular matrix corresponding to a first subcarrier, a first received signal vector corresponding to the first subcarrier, a second upper triangular matrix corresponding to a second subcarrier, a second received signal vector corresponding to the second subcarrier, and an input signal constellation. Each of the first upper triangular matrix and the second upper triangular matrix may have dimensions $N_T \times N_R$, where $N_T$ is an integer number of transmitter antennas and $N_R$ is an integer number of receiver antennas used in a MIMO-OFDM communications system including the nonlinear MIMO-OFDM detector, where $N_R$ and $N_T$ are integers and $1 < N_T \leq N_R$.

The vector arithmetic unit may include a storage element and a vector signal processor configured to execute instructions stored in the storage element. The instructions may be executable by the vector signal processor to cause the vector signal processor to compute the first metrics and the second metrics. The sorting and indexing unit may be coupled as a coprocessor to the vector signal processor. The nonlinear MIMO-OFDM detector may be configured to traverse the first search tree breadth-first to provide first $N_T$ detected data symbols transmitted using corresponding antennas of $N_T$ transmitter antennas and received using $N_R$ receiver antennas and a first subcarrier. The nonlinear MIMO-OFDM detector may be configured to traverse the second search tree breadth-first to provide second $N_T$ detected data symbols transmitted using corresponding antennas of the $N_T$ transmitter antennas and a second subcarrier. $N_R$ and $N_T$ are integers and $1 < N_T \leq N_R$.

In at least one embodiment, a method for MIMO-OFDM detection includes sequentially computing first metrics corresponding to a first current tree level of a first search tree and second metrics corresponding to a second current tree level of a second search tree. The method includes identifying lowest first metrics of the first metrics and lowest second metrics of the second metrics. The method includes sequentially providing first indices of the lowest first metrics and second indices of the lowest second metrics as inputs to a sequential computation for a first next tree level of the first search tree and a second next tree level of the second search tree, respectively. The second metrics are computed concurrently with the identifying of the lowest first metrics. The first search tree may correspond to a first subcarrier of an OFDM symbol and the second search tree may correspond to a second subcarrier of the OFDM symbol. The identifying may include sorting and indexing the first metrics in parallel with sorting and indexing the second metrics. The sorting and indexing may include receiving the first metrics in batches. Each batch may include a subset of the first metrics.

The sequentially computing may compute the first metrics and the second metrics in response to a first upper triangular matrix corresponding to a first subcarrier, a first received signal vector corresponding to the first subcarrier, a second upper triangular matrix corresponding to a second subcarrier, a second received signal vector corresponding to the second subcarrier, and an input signal constellation. Each of the first upper triangular matrix and the second upper triangular matrix may have dimensions $N_T \times N_R$, where $N_T$ is an integer number of transmitter antennas and $N_R$ is an integer number of receiver antennas used in a MIMO-OFDM communications system including the nonlinear MIMO-OFDM detector and where $N_R$ and $N_T$ are integers and $1 < N_T \leq N_R$. The method may include detecting first $N_T$ data symbols transmitted using corresponding antennas of $N_T$ transmitter antennas and received using $N_R$ receiver antennas and a first subcarrier, based on the lowest first metrics. The method may include detecting second $N_T$ data symbols transmitted using corresponding antennas of the $N_T$ transmitter antennas and a second subcarrier, based on the lowest second metrics, where $N_R$ and $N_T$ are integers and $1 < N_T \leq N_R$.

In at least one embodiment, a nonlinear MIMO-OFDM detector includes a vector arithmetic unit configured to compute node metrics for each of a plurality of search trees. The node metrics of the plurality of search trees are generated interleaved by search tree for each tree level batch. The nonlinear MIMO-OFDM detector includes a sorting and indexing unit including a plurality of atomic sorting and indexing units. Each atomic sorting and indexing unit is configured to sort and index the node metrics of a corresponding search tree of the plurality of search trees to generate indexed node metrics for the corresponding search tree. The vector arithmetic unit and the sorting and indexing unit form a pipeline configured to concurrently process the plurality of search trees. Each search tree is used to detect data on a corresponding subcarrier of a plurality of subcarriers of an OFDM symbol transmitted using a corresponding antenna of $N_T$ transmitter antennas and received using $N_R$ receiver antennas. Each atomic sorting and indexing unit may operate on corresponding metrics for a current level of a corresponding search tree in batches. The vector arithmetic unit may compute the node metrics for each of the plurality of search trees in response to a corresponding upper triangular matrix, a corresponding received signal vector, and an input signal constellation. The corresponding upper triangular matrix may have dimensions $N_T \times N_R$, where $N_T$ is an integer number of transmitter antennas and $N_R$ is an integer number of receiver antennas used in a MIMO-OFDM communications system including the nonlinear MIMO-OFDM detector, and where $N_R$ and $N_T$ are integers and $1 < N_T \leq N_R$. The vector arithmetic unit may include a storage element and a vector signal processor configured to execute instructions stored in the storage element. The instructions may be executable by the vector signal processor to cause the vector signal processor to compute the node metrics. The sorting and indexing unit may be coupled as a coprocessor to the vector signal processor.

Although the invention is described herein with reference to specific embodiments, various modifications and changes can be made without departing from the scope of the present invention as set forth in the claims below. For example, although the detector is described as implementing QRD-M detection, the techniques described herein may be adapted to other detection techniques. In addition, although the nonlinear tree search techniques are described with application to a nonlinear MIMO-OFDM detector, techniques described herein may be adapted to other search tree applications. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A nonlinear multiple input, multiple output orthogonal frequency-division multiplexing (MIMO-OFDM) detector comprising:
   a vector arithmetic unit configured to sequentially compute first metrics corresponding to a first current tree level of a first search tree and second metrics corresponding to a second current tree level of a second search tree; and
   a sorting and indexing unit configured to sort the first metrics and the second metrics sequentially received from the vector arithmetic unit and configured to sequentially provide first indices of lowest first metrics and second indices of lowest second metrics to the vector arithmetic unit, the lowest first metrics being first inputs to the vector arithmetic unit for a first next tree level of the first search tree and the lowest second metrics being second inputs to the vector arithmetic unit for a second next tree level of the second search tree,
   wherein the vector arithmetic unit and the sorting and indexing unit are coupled in a pipeline that computes the second metrics concurrently with sorting and indexing of the first metrics, and
   wherein the first search tree corresponds to a first subcarrier of an OFDM symbol.

2. The nonlinear MIMO-OFDM detector, as recited in claim 1, wherein the second search tree corresponds to a second subcarrier of the OFDM symbol.

3. The nonlinear MIMO-OFDM detector, as recited in claim 1, wherein the sorting and indexing unit comprises:
   a first atomic sorting and indexing unit configured to sort the first metrics to generate sorted first metrics and configured to identify the lowest first metrics of the sorted first metrics,
   a second atomic sorting and indexing unit configured to sort the second metrics to generate sorted second metrics and configured to identify the lowest second metrics of the sorted second metrics.

4. The nonlinear MIMO-OFDM detector, as recited in claim 3, wherein the first and second search trees each include p tree levels, where p is an integer greater than one, and the vector arithmetic unit provides metrics to the first atomic sorting and indexing unit and the second atomic sorting and indexing unit for each of p tree levels in round robin order and the vector arithmetic unit receives indices from the first atomic sorting and indexing unit and the second atomic sorting and indexing unit for each of the p tree levels in round robin order.

5. The nonlinear MIMO-OFDM detector, as recited in claim 3, wherein each of the first atomic sorting and indexing unit and the second atomic sorting and indexing unit operates on the first metrics and the second metrics, respectively, in batches of the first metrics and the second metrics, respectively.

6. The nonlinear MIMO-OFDM detector, as recited in claim 3, further comprising:
   a first storage element configured to store a first upper triangular matrix generated using QR decomposition of a first estimated channel matrix corresponding to a first subcarrier; and
   a second storage element configured to store a second upper triangular matrix generated using QR decomposition of a second estimated channel matrix corresponding to a second subcarrier,
   wherein the first estimated channel matrix and the second estimated channel matrix have $N_T \times N_R$ elements, where $N_T$ is a number of transmitter antennas used in a MIMO-OFDM communications system including the nonlinear MIMO-OFDM detector and $N_R$ is a number of receiver antennas used in the MIMO-OFDM communications system.

7. The nonlinear MIMO-OFDM detector, as recited in claim 3, wherein the nonlinear MIMO-OFDM detector sorts and indexes a batch of the first metrics concurrently with sorting and indexing of a batch of the second metrics and concurrently with computations of third metrics for the first next tree level.

8. The nonlinear MIMO-OFDM detector, as recited in claim 1, wherein the vector arithmetic unit computes the first metrics and the second metrics in response to a first upper triangular matrix corresponding to a first subcarrier, a first received signal vector corresponding to the first subcarrier, a second upper triangular matrix corresponding to a second subcarrier, a second received signal vector corresponding to the second subcarrier, and an input signal constellation, wherein each of the first upper triangular matrix and the second upper triangular matrix has dimensions $N_T \times N_R$, where $N_T$ is an integer number of transmitter antennas and $N_R$ is an integer number of receiver antennas used in a MIMO-OFDM communications system including the nonlinear MIMO-OFDM detector, where $N_R$ and $N_T$ are integers and $1 < N_T \leq N_R$.

9. The nonlinear MIMO-OFDM detector, as recited in claim 1, wherein the vector arithmetic unit comprises:
   a storage element; and
   a vector signal processor configured to execute instructions stored in the storage element, the instructions being executable by the vector signal processor to cause the vector signal processor to compute the first metrics and the second metrics,
   wherein the sorting and indexing unit is coupled as a coprocessor to the vector signal processor.

10. The nonlinear MIMO-OFDM detector, as recited in claim 1,
    wherein the nonlinear MIMO-OFDM detector is configured to traverse the first search tree breadth-first to provide first $N_T$ detected data symbols transmitted using corresponding antennas of $N_T$ transmitter antennas and received using $N_R$ receiver antennas and a first subcarrier, and
    wherein the nonlinear MIMO-OFDM detector is configured to traverse the second search tree breadth-first to provide second $N_T$ detected data symbols transmitted using corresponding antennas of the $N_T$ transmitter antennas and a second subcarrier,
    wherein $N_R$ and $N_T$ are integers and $1 < N_T \leq N_R$.

11. A method for multiple input, multiple output orthogonal frequency-division multiplexing (MIMO-OFDM) detection, the method comprising:
    sequentially computing first metrics corresponding to a first current tree level of a first search tree and second metrics corresponding to a second current tree level of a second search tree;

identifying lowest first metrics of the first metrics and lowest second metrics of the second metrics; and sequentially providing first indices of the lowest first metrics and second indices of the lowest second metrics as inputs to a sequential computation for a first next tree level of the first search tree and a second next tree level of the second search tree, respectively, wherein the second metrics are computed concurrently with the identifying the lowest first metrics.

12. The method, as recited in claim 11, wherein the first search tree corresponds to a first subcarrier of an OFDM symbol and the second search tree corresponds to a second subcarrier of the OFDM symbol.

13. The method, as recited in claim 11, wherein the identifying comprises:

sorting and indexing the first metrics in parallel with sorting and indexing the second metrics.

14. The method, as recited in claim 13, wherein the sorting and indexing comprises:

receiving the first metrics in batches, each batch including a subset of the first metrics.

15. The method, as recited in claim 11, wherein the sequentially computing computes the first metrics and the second metrics in response to a first upper triangular matrix corresponding to a first subcarrier, a first received signal vector corresponding to the first subcarrier, a second upper triangular matrix corresponding to a second subcarrier, a second received signal vector corresponding to the second subcarrier, and an input signal constellation, wherein each of the first upper triangular matrix and the second upper triangular matrix has dimensions $N_T \times N_R$, where $N_T$ is an integer number of transmitter antennas and $N_R$ is an integer number of receiver antennas used in a MIMO-OFDM communications system including the nonlinear MIMO-OFDM detector, where $N_R$ and $N_T$ are integers and $1 < N_T \leq N_R$.

16. The method, as recited in claim 11, detecting first $N_T$ data symbols transmitted using corresponding antennas of $N_T$ transmitter antennas and received using $N_R$ receiver antennas and a first subcarrier, based on the lowest first metrics, and detecting second $N_T$ data symbols transmitted using corresponding antennas of the $N_T$ transmitter antennas and a second subcarrier, based on the lowest second metrics, wherein $N_R$ and $N_T$ are integers and $1 < N_T \leq N_R$.

17. A nonlinear multiple input, multiple output orthogonal frequency-division multiplexing (MIMO-OFDM) detector comprising:

a vector arithmetic unit configured to compute node metrics for each of tree level of a plurality of search trees, the node metrics of the plurality of search trees being generated interleaved by search tree for each tree level batch; and a sorting and indexing unit comprising a plurality of atomic sorting and indexing units, each atomic sorting and indexing unit being configured to sort and index the node metrics of a corresponding search tree of the plurality of search trees to generate indexed node metrics for the corresponding search tree, wherein the vector arithmetic unit and the sorting and indexing unit form a pipeline configured to concurrently process the plurality of search trees, each search tree being used to detect data on a corresponding subcarrier of a plurality of subcarriers of an OFDM symbol transmitted using a corresponding antenna of $N_T$ transmitter antennas and received using $N_R$ receiver antennas.

18. The nonlinear MIMO-OFDM detector, as recited in claim 17, wherein each atomic sorting and indexing unit operates on corresponding metrics for a current level of a corresponding search tree in batches.

19. The nonlinear MIMO-OFDM detector, as recited in claim 17, wherein the vector arithmetic unit computes the node metrics for each of the plurality of search trees in response to a corresponding upper triangular matrix, a corresponding received signal vector, and an input signal constellation, wherein the corresponding upper triangular matrix has dimensions $N_T \times N_R$, where $N_T$ is an integer number of transmitter antennas and $N_R$ is an integer number of receiver antennas used in a MIMO-OFDM communications system including the nonlinear MIMO-OFDM detector, where $N_R$ and $N_T$ are integers and $1 < N_T \leq N_R$.

20. The nonlinear MIMO-OFDM detector, as recited in claim 17, wherein the vector arithmetic unit comprises:

a storage element; and a vector signal processor configured to execute instructions stored in the storage element, the instructions being executable by the vector signal processor to cause the vector signal processor to compute the node metrics, wherein the sorting and indexing unit is coupled as a coprocessor to the vector signal processor.

* * * * *